United States Patent [19]

Lim et al.

[11] Patent Number: 5,974,552
[45] Date of Patent: Oct. 26, 1999

[54] METHOD AND APPARATUS FOR EXECUTING A SCHEDULED OPERATION AFTER WAKE UP FROM POWER OFF STATE

[75] Inventors: Jae-Doo Lim, Seoul; Chang-Ho Lee, Kyungki-do, both of Rep. of Korea

[73] Assignee: SamSung Electronics Co., Ltd., Kyungki-do, Rep. of Korea

[21] Appl. No.: 08/773,718

[22] Filed: Dec. 23, 1996

[30] Foreign Application Priority Data

Dec. 29, 1995 [KR] Rep. of Korea ............ 95-66715

[51] Int. Cl.$^6$ ............................................. G06F 1/32
[52] U.S. Cl. ................. 713/300; 713/320; 713/323; 713/324; 379/142
[58] Field of Search ........ 379/142; 395/750.01–750.06; 364/707

[56] References Cited

U.S. PATENT DOCUMENTS

| | | | |
|---|---|---|---|
| 3,801,963 | 4/1974 | Chen | 360/5 |
| 4,143,283 | 3/1979 | Graf et al. | 307/66 |
| 4,203,153 | 5/1980 | Boyd | 395/750.05 |
| 4,665,536 | 5/1987 | Kim | 364/707 |
| 4,747,041 | 5/1988 | Engel et al. | 395/750.06 |
| 4,763,333 | 8/1988 | Byrd | 395/182.2 |
| 4,825,352 | 4/1989 | Iijima et al. | |
| 4,847,782 | 7/1989 | Brown, Jr. et al. | |
| 4,878,196 | 10/1989 | Rose | 395/750.02 |
| 4,885,521 | 12/1989 | Crampton | 320/126 |
| 4,908,790 | 3/1990 | Little | 395/182.12 |
| 5,018,148 | 5/1991 | Patel et al. | 395/182.2 |
| 5,021,983 | 6/1991 | Nguyen et al. | 364/707 |
| 5,151,907 | 9/1992 | Robbins | 395/182.2 |
| 5,163,124 | 11/1992 | Yabe et al. | 395/750.06 |
| 5,167,024 | 11/1992 | Smith et al. | 395/750.04 |
| 5,204,963 | 4/1993 | Noya et al. | 365/229 |
| 5,222,231 | 6/1993 | Gunji | 395/188.01 |
| 5,247,619 | 9/1993 | Mutoh et al. | 395/283 |
| 5,276,865 | 1/1994 | Thorpe | 395/182.22 |
| 5,276,890 | 1/1994 | Arai | 395/750.05 |
| 5,283,905 | 2/1994 | Saadeh et al. | 395/750.06 |
| 5,300,874 | 4/1994 | Shimamoto et al. | 320/106 |
| 5,307,500 | 4/1994 | Oshiba et al. | |
| 5,311,441 | 5/1994 | Tayama et al. | 702/63 |
| 5,315,161 | 5/1994 | Robinson et al. | 307/66 |
| 5,317,752 | 5/1994 | Jewett et al. | 395/182.12 |
| 5,337,044 | 8/1994 | Folger et al. | 340/825.44 |
| 5,339,426 | 8/1994 | Aoshima | 395/651 |
| 5,339,437 | 8/1994 | Yuen | 395/734 |
| 5,375,246 | 12/1994 | Kimura et al. | 365/229 |
| 5,384,721 | 1/1995 | Joto | 364/707 |
| 5,386,552 | 1/1995 | Garney | 395/182.08 |
| 5,396,637 | 3/1995 | Harwell et al. | 365/228 |
| 5,410,713 | 4/1995 | White et al. | 395/750.07 |
| 5,414,861 | 5/1995 | Horning | 365/229 |
| 5,416,834 | 5/1995 | Bales et al. | 379/211 |

(List continued on next page.)

Primary Examiner—Glenn A. Auve
Assistant Examiner—Rupal D. Dharia
Attorney, Agent, or Firm—Robert E. Bushnell, Esq.

[57] ABSTRACT

The present invention provides a digital computer system executing a scheduled operation and method thereof including: a main system having a central processing unit for processing an interrupt processing routine; a bus which transmits information to system elements by connecting the main system and the system elements; a system memory which is connected to the bus and stores system information such as hibernation information; a power supply which supplies an external power to a computer system and supplies power to the computer system when the external power is turned off; a wake-up source which senses, receives and outputs an external change; a power control connected to the wake-up source, the power supply and the bus, controls the computer system for a hibernation function and receives the external change signal from the wake-up source in order that the computer system can execute the scheduled operation; and a storing device which is connected to the bus and stores data such as information of the system memory and the central processing unit.

11 Claims, 4 Drawing Sheets

U.S. PATENT DOCUMENTS

| | | | |
|---|---|---|---|
| 5,426,775 | 6/1995 | Boccon-Gibod | 395/183.12 |
| 5,428,806 | 6/1995 | Pocrass | 395/284 |
| 5,432,846 | 7/1995 | Norio | 379/266 |
| 5,432,946 | 7/1995 | Allard et al. | 395/750.02 |
| 5,446,906 | 8/1995 | Kardach et al. | 395/750.05 |
| 5,450,003 | 9/1995 | Cheon | 323/272 |
| 5,461,558 | 10/1995 | Patsiokas et al. . | |
| 5,475,847 | 12/1995 | Ikeda . | |
| 5,477,476 | 12/1995 | Schanin et al. | 395/750.06 |
| 5,483,464 | 1/1996 | Song | 395/750.01 |
| 5,485,623 | 1/1996 | Kurokawa et al. | 395/182.2 |
| 5,511,204 | 4/1996 | Crump et al. | 395/750.07 |
| 5,513,359 | 4/1996 | Clark et al. | 395/750.05 |
| 5,522,087 | 5/1996 | Hsiang . | |
| 5,530,877 | 6/1996 | Hanaoka | 395/750.01 |
| 5,530,879 | 6/1996 | Crump et al. | 395/750.05 |
| 5,542,035 | 7/1996 | Kikinis et al. | 395/750.05 |
| 5,544,036 | 8/1996 | Brown, Jr. et al. | 364/145 |
| 5,548,763 | 8/1996 | Combs et al. | 395/750.05 |
| 5,552,860 | 9/1996 | Yamashita et al. . | |
| 5,560,021 | 9/1996 | Vook et al. | 395/750.05 |
| 5,585,677 | 12/1996 | Cheon et al. | 307/64 |
| 5,588,054 | 12/1996 | Shin et al. | 379/413 |
| 5,596,628 | 1/1997 | Klein | 379/93.11 |
| 5,603,038 | 2/1997 | Crump et al. | 395/750.02 |
| 5,655,015 | 8/1997 | Walsh et al. | 379/201 |
| 5,664,203 | 9/1997 | Hong et al. | 395/750.05 |
| 5,666,541 | 9/1997 | Sellers | 395/750.06 |
| 5,687,308 | 11/1997 | Jardine et al. | 395/182.02 |
| 5,692,197 | 11/1997 | Narad et al. | 395/750.05 |
| 5,708,819 | 1/1998 | Dunnihoo | 395/750.05 |
| 5,708,820 | 1/1998 | Park et al. | 395/750.05 |
| 5,721,936 | 2/1998 | Kikinis et al. | 395/750.05 |
| 5,742,514 | 4/1998 | Bonola | 1/1 |
| 5,745,391 | 4/1998 | Topor | 364/707 |
| 5,748,971 | 5/1998 | Choi et al. | 395/750.03 |
| 5,805,910 | 9/1998 | Lee et al. | 395/750.05 |
| 5,809,223 | 9/1998 | Lee et al. | 395/182.02 |

METHOD AND APPARATUS FOR EXECUTING A SCHEDULED OPERATION AFTER WAKE UP FROM POWER OFF STATE

CLAIM OF PRIORITY

This application makes reference to, incorporates the same herein, and claims all benefits accruing under 35 U.S.C § 119 from an application entitled A Digital Computer System Executing a Scheduled Operation, and Method Thereof earlier filed in the Korean Industrial Property Office on Dec. 29, 1995, and there duly assigned Serial No. 95-66715 by that Office.

BACKGROUND OF THE INVENTION

1. Field of the Invention

The present invention relates to a digital computer system executing a scheduled operation with the system having the apparatus and method to execute the sceheduled operation. More particularly, the present invention relates to the digital computer system having a power management function that senses the request of a wake-up source, executes the scheduled operation by waking an operating system, and stands by in a hibernation state.

2. Description of the Related Arts

Interruption of computer operations (by powering on and off) concerns today's computer systems. Typically, when an interruption of electric power occurs during a computer operation, the data (along the operating system in process) are lost. On this matter, among the exemplars of the contemporary practice in the related arts is Yamashita et al. (U.S. Pat. No. 5,552,860, Monitoring System In Auto-Restoring Image Reproducing System, Sep. 3, 1996) discussing a monitoring system in auto-restoring image reproducing system. It involves display by an image reproducing machine of the system in connection with fault diagnosis and auto-restoration processes by the image reproducing machine. Hsiang (U.S. Pat. No. 5,522,087, System For Selectively Operating In Different Modes Depending Upon Receiving Signal From A Host Computer Within A Time Window Upon Power Up, May 28, 1996) discusses a system for selectively operating in different modes depending upon receiving signal from a host computer within a time window upon power up. A control available time window of prearranged duration is set up in the local device in response to a power on start condition. Ikeda (U.S. Pat. No. 5,475,847, Power Saving Control System For Computer System With Feature Of Selective Initiation Of Power Saving Control, Dec. 12, 1995) discusses a power saving control system for computer system with feature of selective initiation of power saving control. Patsiokas et al. (U.S. Pat. No. 5,461,558, Method And Apparatus Having Time Dependent Sleep Modes, Oct. 24, 1995) discusses a method and apparatus having time dependent sleep modes. A remote meter reading system includes a group of meter interface units in which cach meter interface unit operates between periods of activity and inactivity. Oshiba et al. (U.S. Pat. No. 5,307,500, Integrated Circuit Device With Stand-By Cancellation, Apr. 26, 1994) discusses an integrated circuit device having a processing unit with a plurality of input terminals and adapted to cancel its stand-by mode when a pulse-like control signal having a predetermined duration is received by one of the input terminals. Brown, Jr. et al. (U.S. Pat. No. 4,847,782, Energy Management System With Responder Unit Having An Override, Jul. 11, 1989) discusses an energy management system provides energy managing signals over a medium, such as TV cables, power lines, telephone lines or free space radio frequency transmissions, to a plurality of subscriber units. Iijima et al. (U.S. Pat. No. 4,825,352, Process Control System And Method Thereof, Apr. 25, 1989) discusses a process control system having a timer circuit which fixes operational periods by issuing an instruction for starting each of a plurality of time periods in such a manner that the computation of control blocks will occur during periods of fixed duration. From my study of these exemplars of the contemporary practice and of the prior art, I find that there is a need for an effective digital computer system—having a power management function that senses the request of a wake-up source, executes the scheduled operation by waking an operating system, and stands by in a hibernation state—that functions with the features of the present invention.

SUMMARY OF THE INVENTION

An object of the present invention is to provide an improved digital computer system executing a scheduled operation with the system having the apparatus and method to execute the sceheduled operation.

Another object of the present invention is to provide an improved digital computer system having a power management function that senses the request of a wake-up source, executes the scheduled operation by waking an operating system, and stands by in a hibernation state.

A further object of the present invention is to provide a digital computer system having a power management function that senses the request of a wake-up source, executes the scheduled operation by waking an operating system corresponding to the wake-up source from a hibernation state, and stands by in the hibernation state again.

To achieve one or more of the above objects, the present invention can include a main system which can process an interrupt processing routine and a bus which transmits information to each system elements by connecting the main system and the system elements. The present invention can further include a system memory which is connected to the bus and stores system information such as a hibernation information, power supply means which supplies an external power to a computer system and supplies power to the computer system when the external power is turned off, and wake-up source means which senses, receives and outputs an external change. A power control means (which is connected to the wake-up source means, the power supply means and the bus) controls the computer system for a hibernation function and receives the external change signal from the wake-up source means in order that the computer system can execute the scheduled operation when the time predetermined by a timer has come. A storing device is connected to the bus and stores data such as information of the system memory and the main system.

In another aspect of the present invention, the present invention can include the steps of receiving the wake-up request from the wake-up source means or the wake-up request generated when the predetermined time of a timer has come, supplying power to the computer system so as to operate the system normally, determining whether a hibernation mode is set; and restoring the data and the operating system stored in the storing device if the hibernation mode is set. The invention can also include the steps of: initializing the computer system and executing a POST (power on self test) if the hibernation mode is not set; setting the data and the operating system; executing the scheduled operation; storing the data and the operating system if the hibernation mode is set; turning off the power of the computer system; and operating the hibernation mode.

In another aspect of the present invention, the present invention can include the steps of executing a general operation, determining whether the scheduled operation is to be executed in order to wake-up the computer system, determining whether the computer system is to be woken by a timer if the executing the scheduled operation is determined. The invention can also include the steps of setting the wake-up scheduled time if the wake-up by the timer is determined in the above step, sensing the wake-up request of the wake-up source means if the wake-up by the timer isn't determined in the above step, setting the operation to be executed after the computer system is woken up, determining whether the hibernation mode is set, storing the data and the operating system if the hibernation mode is set, turning off the power, and standing by.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will become apparent from a study of the following detailed description with reference to the accompanying drawings.

Due to the improvement of power management functions and system management fuctions (from such new features as the use of a CPU (central processing unit)), a computer system is capable of storing the operating system upon the interruption of electric power and restoreing the operating system when power is supplied again. And, when the computer system is not used for a predetermined time, the power is saved by using a minimum necessary power and stopping the operation of the rest of the circuit. The hibernation system has two functions, as follows:

1. An emergency automatic restoration function for restoring the operating state of a computer to the previous operating state—if power is supplied again after the previous operating state of a computer is stored in an auxiliary memory such as a hard disk, when power is cut off by sudden interruption of electric power or in error by an user—according to the contents which is stored in an auxiliary memory; and
2. A power saving function that automatically cuts off the power—after storing a previous operating state in an auxiliary memory such as a hard disk, when a computer is not used for a predetermined time—and resuming the power supply and returning to the previous operating state when a computer is used again. At least one documentary record relates to this topic of the emergency automatic restoration function and the power saving function. "Network hibernation system and the controlling method thereof" of Korean Patent Application No. 95-40100 (Filing Date: Nov. 7, 1995). In the contemporary practice of this topic, a scheduled operation was executed when a sensor was mounted to the computer system and the sensor sensed an external change. Such an operation was executed through a telephone, a facsimile or a keyboard connected to the computer system. However, in the above prior art, the computer system must stand in the state of a normal operation in order to execute the operation.

Figure 1:
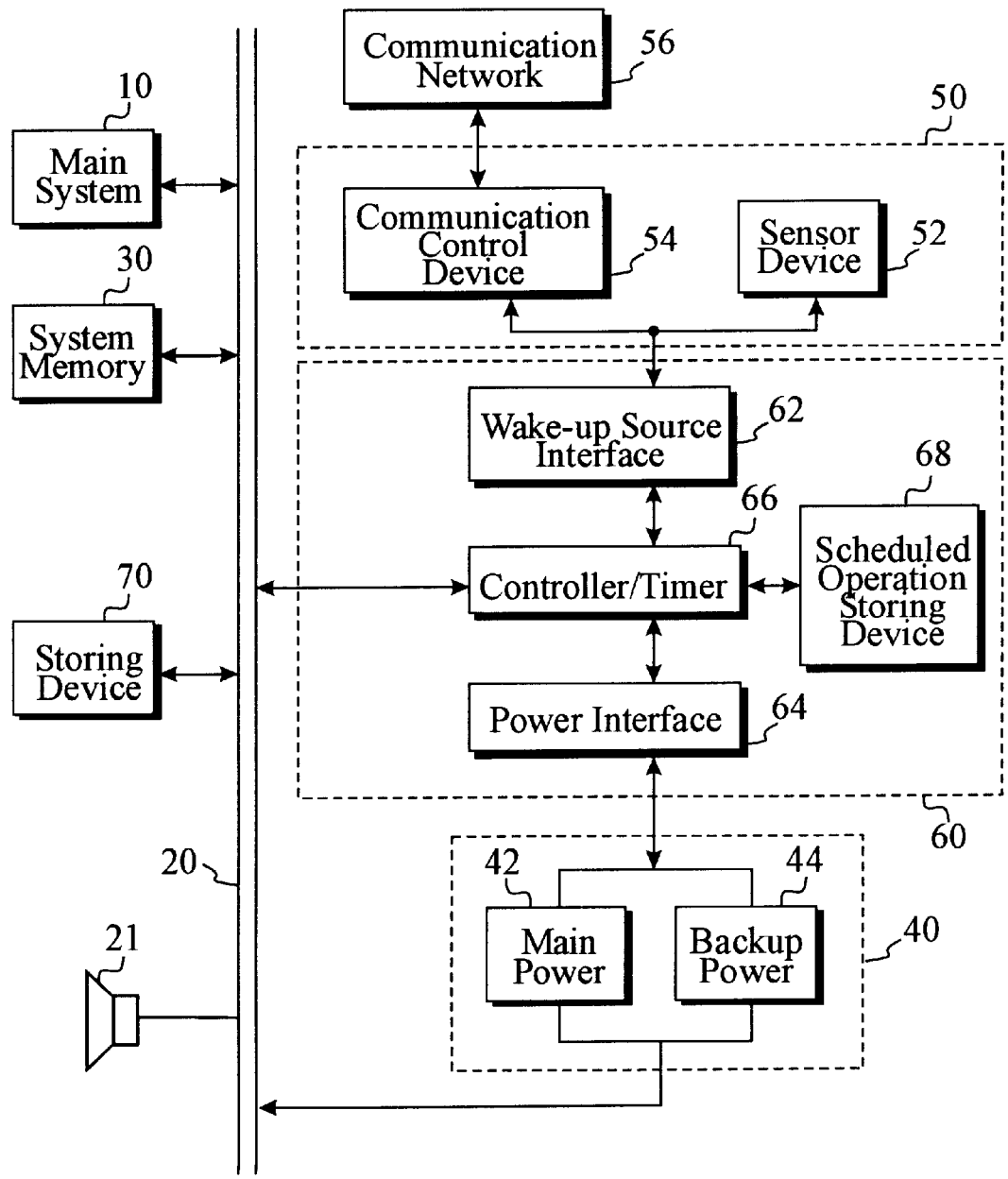
FIG. 1 is a block diagram illustrating a digital computer system executing a scheduled operation in accordance with a preferred embodiment of the present invention.

Turning now to the drawings, as shown in FIG. 1, a digital computer system executing a scheduled operation in accordance with a preferred embodiment of the present invention includes: a main system 10 which can process an interrupt processing routine; a bus 20 which transmits information to system elements by connecting the main system and the system elements; a system memory 30 which is connected to the bus and stores system information such as a hibernation information; power supply means 40 which supplies an external power to a computer system and supplies power to the computer system when the external power is turned off; wake-up source means 50 which senses, receives and outputs an external change; power control means 60 which is connected to the wake-up source means 50, the power supply means 40 and the bus 20, controls the computer system for a hibernation function and receives the external change signal from the wake-up source means 50 in order that the computer system can execute the scheduled operation when the time predetermined by a timer has come; and a storing device 70 which is connected to the bus 20 and stores data such as information of the system memory 30 and the main system 10.

The power supply means 40 includes a main power source 42 for receiving and supplying external power to the computer system, and a back-up power source 44 for supplying power by a battery when the power is turned off.

The wake-up source means 50 includes a sensor device 52 outputting a wake-up request signal if the external change is sensed and a communication control device 54. The communication control device 54 makes the main system 10 output a signal to a user by receiving a user instruction from a telephone or a facsimile connected to a communication network and outputting the wake-up request signal.

The power controller 60 includes a scheduled operation storing device 68, a wake-up source interface 62, power interface 64 and controller 66. The wake-up source interface 62 outputs a corresponding wake-up request signal for the wake-up of the computer system if the external change is inputted through the wake-up source means 50. The power interface 64 is connected to a main power source 42 and a back-up power source 44 and controls one another. And, the controller 66 is connected to the bus 20, the wake-up source interface 62 and the power interface 64, outputs a corresponding interrupt signal to the main system 10 through the bus 20 when the computer system is not used for a predetermined time, makes the computer system be in a hibernation state by controlling the power interface 64, supplies the power to the computer system by controlling the power interface 64 when the wake-up request signal is inputted from the wake-up source interface 62, and makes the scheduled operation be executed by the main system 10. The wake-up source interface 62 includes a register which can permit and prohibit the wake-up request of the sensor device 52 or the communication control device 54. the controller 66 including a timer.

Figure 2:
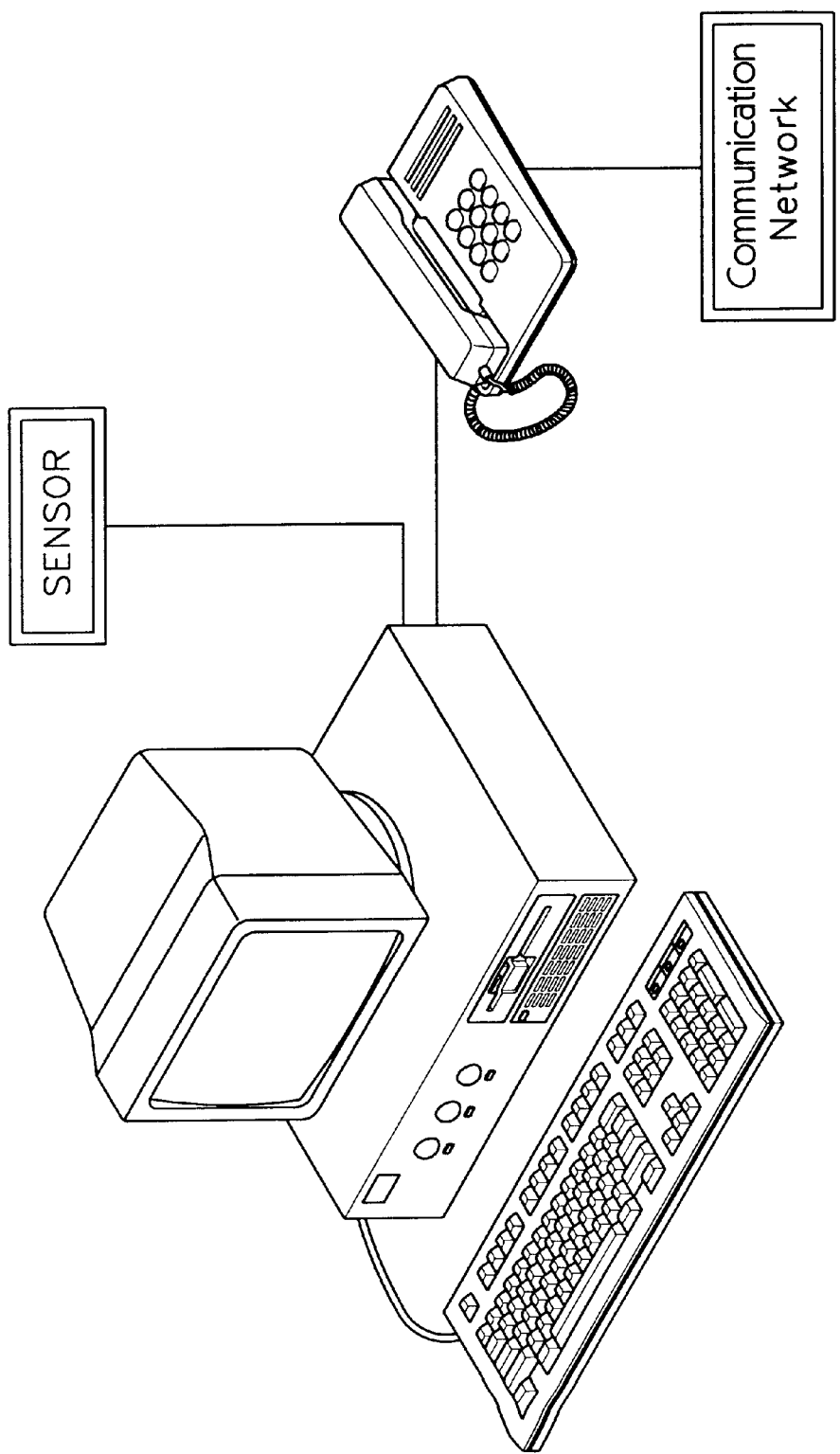
FIG. 2 is a pictorial diagram depicting a digital computer system executing a scheduled operation in accordance with a preferred embodiment of the present invention.

As depicted in FIG. 2, a digital computer system executing a scheduled operation in accordance with a preferred embodiment of the present invention can execute the scheduled operation by connecting to the sensor device, sensing an external change, and a telephone wire, receiving a user instruction.

Figure 3:
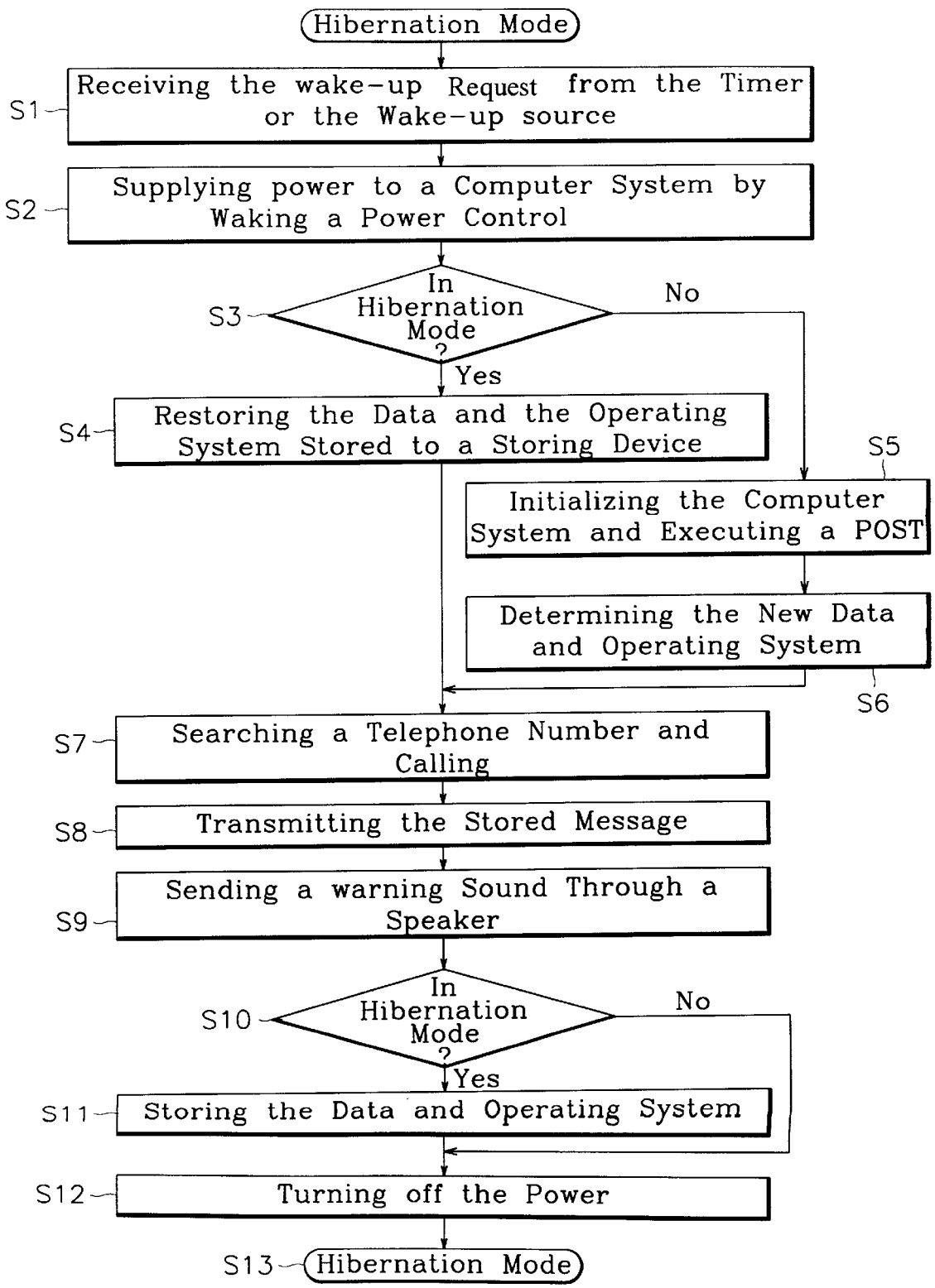
FIG. 3 is a flow chart of a scheduled operation executing method of a digital computer system executing a scheduled operation in accordance with a preferred embodiment of the present invention.

As shown in FIG. 3, a scheduled operation executing method of a digital computer system executing a scheduled operation in accordance with a preferred embodiment of the present invention can include one or more of the steps of: receiving the wake-up request from the wake-up source means 50 or the wake-up request generated when the predetermined time of a timer has come (S1); supplying power to the computer system after waking the power supply means 40 by the power controller 60 (S2); examining a hibernation mode flag in order to recognize the setting of a hibernation mode (S3); restoring the data and the operating system stored in the storing device 70 if the hibernation mode is set in the above step (S4), initializing the computer system and executing a POST (power on self test) if the hibernation mode is not set (S5); setting the data and the operating system (S6); searching for the telephone number corresponding to the wake-up request source, and calling the telephone number through the communication control means (S7); transmitting a stored message corresponding to the telephone number prior to turning off the power of the computer system (S8); sending a warning sound through a speaker 21 prior to turning off the power of the computer system (S9); determining whether the hibernation mode is set (S10); storing the data and the operating system in the storing device if the hibernation mode is set (S11); turning off the power of the computer system (S 12) and operating the hibernation mode if the hibernation mode is set (S13).

Figure 4:
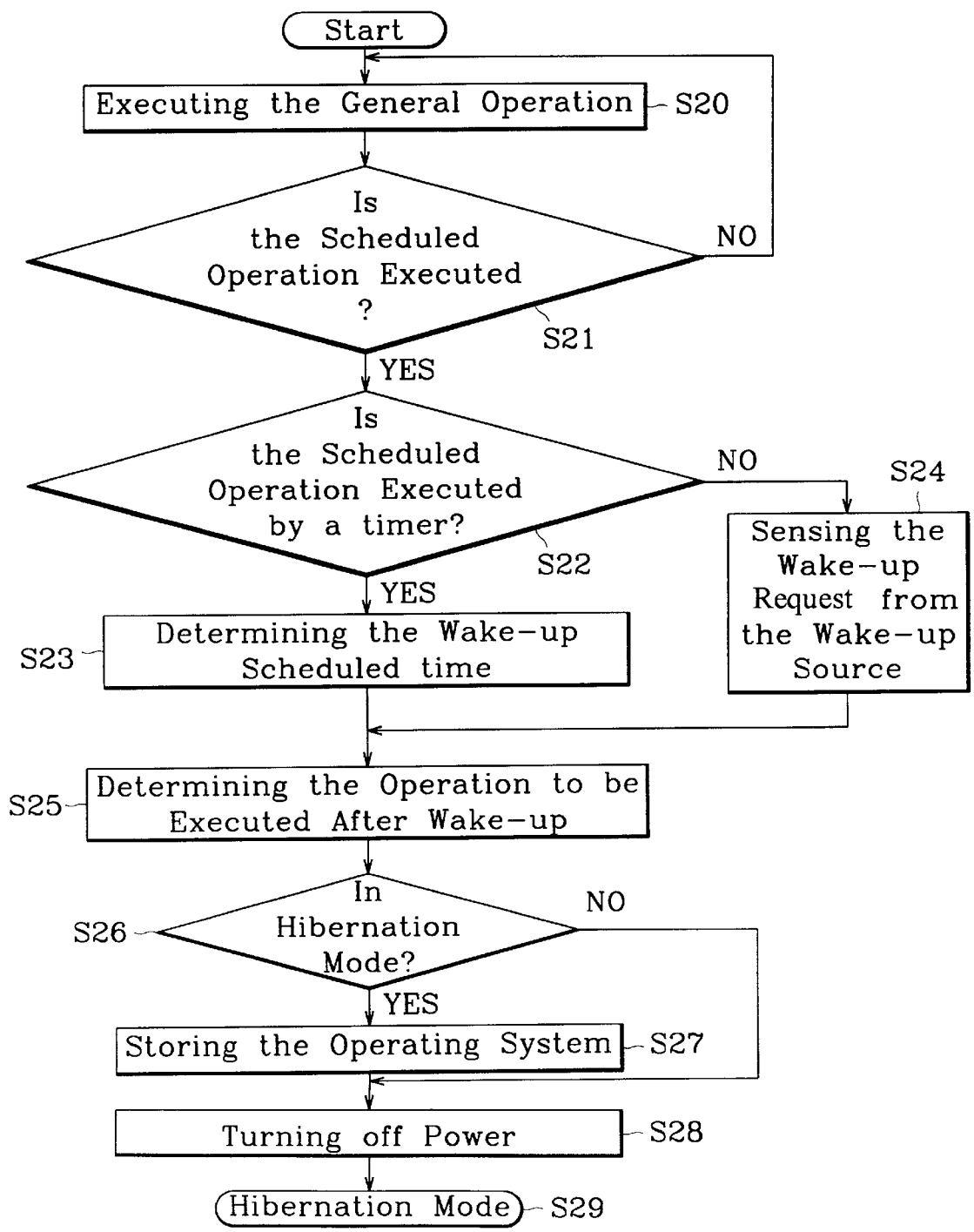
FIG. 4 is a flow chart of a scheduling method of a digital computer system executing a scheduled operation in accordance with a preferred embodiment of the present invention.

As shown in FIG. 4, a scheduling method of a digital computer system executing a scheduled operation in accordance with a preferred embodiment of the present invention can include one or more of the steps of: executing a general operation (S20); determining whether the scheduled operation is to be executed in order to wake-up the computer system (S21); determining whether the computer system is to be woken by a timer if the executing of the scheduled operation is determined (S22); setting the wake-up scheduled time if the wake-up by the timer is determined in the above step (S23); sensing the wake-up request of the wake-up source means 50 if the wake-up by the timer isn't determined in the above step (S24); setting the operation to be executed after the computer system is woken up (S25); determining whether the hibernation mode is set (S26); storing the data and the operating system if the hibernation mode is set (S27); turning off the power (S28); and standing by in the hibernation mode if the hibernation mode is set (S29).

Also, referring to FIG. 4, the operation of a digital computer system executing a scheduled operation in accordance with a preferred embodiment of the present invention is as follows:

First, the user executes a general operation, and determines whether the scheduled operation is to be executed before turning off the power of the computer system (S21). If the executing the scheduled operation isn't determined, the user executes a general operation continuously or turns off the power of the computer system. The user should to determine whether the computer system is to be woken by a timer if the executing of the scheduled operation is determined (S22).

The user sets the wake-up scheduled time if the wake-up by the timer is determined (S23). The wake-up request of the external wake-up source should be sensed by enabling a register of the wake-up source interface 62 if the wake-up by the timer isn't determined (S24). That is, when the instruction is inputted by the user at a long distance through the communication control device 54 connected to the communication network 56 or the external change is sensed by the sensor device 52, the related register should be enabled in order that the change is inputted to the wake-up source interface 62.

The user sets the operation to be executed among the operations stored to the scheduled operation storing device 68 after the computer system is woken up (S25). The power of the computer system is turned off after setting the wake-up source. At this time, the main system determines whether the hibernation mode is set after examining the flag stored to the system memory 30 (S26). The main system 10 stores the data and the operating system to the storing device 70 if the hibernation mode is set (S27), and the power cut-off signal is outputted to the power control means (S28).

If the hibernation mode isn't set, the power cut-off signal is outputted to the power controller 60 (S28) without storing the data and the operating system. The power cut-off signal is inputted to the power interface 64 through the controller 66, and the power interface 64 outputs the power cut-off signal to the main power source 42 and the back-up power source 44 (S28). The main power source 42 and the back-up power source 44 cuts off the power after receiving the power cut-off signal (S28), and the system waits for the wake-up request in a hibernation state (S29) if the hibernation mode is set.

The scheduled operation woken by the wake-up request is explained below with reference to FIG. 3.

The wake-up source includes two kinds as follows:
1. the time to be woken is determined with a timer of the controller 66, and the wake-up request signal is generated in the predetermined time; and
2. the wake-up source means 50 produces the wake-up request signal when the external change is sensed by the sensor device 52 of the wake-up source means 50 or the user instruction is inputted through the communication control device 54.

The wake-up request is inputted to the power controller 60 if the register of the wake-up source interface 62 is enabled. The wake-up request produced from two kinds of the wake-up source is inputted to the controller 66 (SI). The controller 66 receives the above wake-up request signal and outputs a power supply request signal to the power interface 64 (S2). The power interface 64 receives the power supply request signal and outputs a power supply signal to the main power source 42 of the power supply means 40 and the main power source 42 supplies the power in order that the system is operated normally.

If the power is supplied like as above, the main system 10 determines whether the hibernation mode is set by checking the flag stored to the system memory 30 (S3). If the hibernation mode is set, the main system 10 restores the data and the operating system stored to the storing device 70 (S4). However, if the hibernation mode is not set, the system is initialized, the POST (Power On Self Test) is executed (S5) and the data and the operating system stored to the storing device 70 is restored (S6).

The main system then executes the scheduled operation (S7–S9), again referring to FIG. 3. The scheduled operation in accordance with a preferred embodiment of the present invention is as follows. The main system 10 selects the telephone number corresponding to the wake up source for the system among the telephone numbers and calls through the communication control device 54 of the wake-up source means 50 connected to the bus 20 (S7). The main system 10 transmits a stored message prior to turning off the power to the computer system through the telephone wire when the party corresponding to the selected telephone number is connected (S8). And, the warning sound is sent through the speaker connected to the bus 20 prior to turning off the power to the computer system (S9). If the scheduled operation is terminated, the main system 10 determines whether the hibernation mode is set by checking the flag stored to the system memory 30 (S10).

If the hibernation mode is set, the data and the operating system is stored in the storing device 70 (S11), and the power off signal is outputted to the power controller 60 (S 12). If the hibernation mode is not set, the power off signal is outputted to the power controller 60 (S12) without storing the data and the operating system as above. The power off signal is inputted to the power interface 64 through the controller 66 of the power control means 60, and the power interface 64 outputs the power off signal to the main power source 42 and the back-up power source 44 of the power supply means 40 (S12). The main power means 42 and the back-up power means 44 receives the power off signal, the power is turned off (S12) and the system is in a hibernation state (S13) if hibernation mode is set.

As the above embodiments illustrate, the present invention provides a digital computer system executing a scheduled operation and method thereof. More particularly, the digital computer system having a power management function that senses the request of a wake-up source, executes the scheduled operation by waking an operating system corresponding to the wake-up source from a hibernation state, and again stands by in the hibernation state.

What is claimed is:

1. A digital computer system for executing a scheduled operation, comprising:

a main system for processing an interrupt processing routine;

a bus for transmitting information to a plurality of system elements by connecting said main s system and the system elements;

a system memory being connected to said bus for storing system information defining a system and hibernation information defining a hibernation;

a power supply for supplying a first power to said digital computer system and for supplying a second power to said digital computer system when the first power is turned off;

a wake up source for sensing, receiving and sending an external change signal;

a power controller having a scheduled operation storing device for storing the scheduled operation set by a user for execution, said power controller being connected to said wake up source, said power supply and said bus, for controlling said digital computer system for a hibernation function, for receiving the external change signal from said wake up source to execute the scheduled operation, and for facilitating said digital computer system to execute the scheduled operation when a time predetermined by a timer has passed; and a storing device being connected to said bus, for storing data, for storing information from said system memory, and for storing information from said main system, wherein the scheduled operation comprises the steps of:

receiving by said power controller to execute the scheduled operation one of a wake up request as said external change signal from said wake up source and a wake up request generated by said timer indicating when the time predetermined by the timer has passed;

supplying power to said digital computer system, thereby permitting said digital computer system to operate;

determining whether a hibernation mode is set;

if the hibernation mode is set, restoring data and an operating system stored in said storing device;

if the hibernation mode is not set, initializing said digital computer system and executing a power-on-self test;

setting data and an operating system;

executing a warning operation prior to turning off the first power to said digital computer system, wherein the step of executing the warning operation comprises the steps of:

searching for a telephone number corresponding to a wake up request source, and calling through a communication control said telephone number;

transmitting a stored message to said telephone number called prior to turning off the first power to said digital computer system; and sending a warning sound through a speaker prior to turning off the first power to said digital computer system;

if the hibernation mode is set, storing the data and the operating system set by the setting step;

turning off the first power to said digital computer system; and operating in the hibernation mode if the hibernation mode is set.

2. The digital computer system of claim 1, wherein the scheduled operation further comprises the steps of:

determining whether the scheduled operation is to be executed to wake up said digital computer system;

if the scheduled operation is to be executed, determining whether said digital computer system is to be woken up by the timer;

if said digital computer system is to be woken up by the timer, setting a wake up schedule time to execute the scheduled operation;

if said digital computer system is not to be woken up by the timer, sensing the wake up request of said wake up source to execute the scheduled operation; and setting an operation to be executed after said digital computer system is woken up.

3. The digital computer system of claim 1, wherein the first power is from an external source.

4. The digital computer system of claim 1, wherein said wake up source comprises:

a sensor transmitting a wake up request signal if an external change is sensed; and a communication control for controlling said main system in transmitting a signal to a user by receiving a user instruction from one of a telephone and a facsimile connected to a communication network, and for transmitting a wake up request signal.

5. The digital computer system of claim 1, wherein said power supply comprises:

a main power device for receiving and supplying external power to said digital computer system; and a back up power device for supplying power by a battery when the external power is turned off.

6. The digital computer system of claim 1, wherein said power controller comprises:

a wake up source interface for transmitting a corresponding wake-up request signal for waking the digital computer system if the external change signal is received from said wake up source;

a power interface being connected to a main power source and to a back up power source, and for controlling said main power source and said back up power source; and a controller being connected to said bus, to said wake up source interface, and to said power interface, said controller for transmitting a corresponding interrupt signal to said main system through said bus after said digital computer system is not used for a predetermined period of time, for setting said digital computer system to be in a hibernation state by controlling said power interface, for supplying power to said digital computer system by controlling said power interface when the wake-up request signal is received from said wake up source interface, and for setting the scheduled operation to be executable by said main system.

7. The digital computer system of claim 6, wherein said controller further comprises said timer.

8. The digital computer system of claim 1, wherein said system memory comprises a non-volatile memory element, and stores system data comprising a flag indicating a setting of the hibernation mode.

9. A digital computer system for executing a scheduled operation, comprising:

a main system for processing an interrupt processing routine;

a bus for transmitting information to a plurality of system elements by connecting said main system and the system elements;

a system memory being connected to said bus for storing system information defining a system and hibernation information defining a hibernation;

a power supply for supplying a first power to said digital computer system and for supplying a second power to said digital computer system when the first power is turned off;

a wake up source for sensing, receiving and sending an external change signal;

a power controller having a scheduled operation storing device for storing the scheduled operation set by a user for execution, said power controller being connected to said wake up source, said power supply and said bus, for controlling said digital computer system for a hibernation function, for receiving the external change signal from said wake up source to execute the scheduled operation, and for facilitating said digital computer system to execute the scheduled operation when a time predetermined by a timer has passed; and a storing device being connected to said bus, for storing data, for storing information from said system memory, and for storing information from said main system, wherein said digital computer system executes a warning operation prior to turning off the first power to said digital computer system, said warning operation comprising the steps of:

searching for a telephone number corresponding to a wake up request source, and calling through a communication control said telephone number;

transmitting a stored message to said telephone number called prior to turning off the first power to said digital computer system; and sending a warning sound through a speaker prior to turning off the first power to said digital computer system.

10. A method for executing a scheduled operation in a digital computer system, comprising the steps of:

storing the scheduled operation set by a user for execution;

receiving to execute the scheduled operation one of a wake-up request from a wake up source and a wake-up request generated when a predetermined time of a timer has passed;

supplying power to said digital computer system, thereby permitting said digital computer system to operate;

determining whether a hibernation mode is set;

if the hibernation mode is set, restoring data and an operating system stored in a storing device;

if the hibernation mode is not set, initializing said digital computer system and executing a power on self test;

setting data and an operating system;

executing a warning operation prior to turning off a main power to said digital computer system, wherein executing the warning operation comprises the steps of:

searching for a telephone number corresponding to a wake up request source, and calling through a communication control said telephone number;

transmitting a stored message to said telephone number called prior to turning off the main power to said digital computer system; and sending a warning sound through a speaker prior to turning off the main power to said digital computer system;

if the hibernation mode is set, storing the data and the operating system set by the setting step;

turning off the main power to said digital computer system; and operating in the hibernation mode if the hibernation mode is set.

11. A method for executing a scheduled operation in a digital computer system, comprising the steps of:

storing the scheduled operation set by a user for execution;

determining whether the scheduled operation is to be executed to wake up said digital computer system;

if the scheduled operation is to be executed, determining whether said digital computer system is to be woken up by a timer;

if said digital computer system is to be woken up by the timer, setting a wake up scheduled time to execute the scheduled operation;

if said digital computer system is not to be woken up by the timer, sensing a wake up request of a wake up source to execute the scheduled operation;

setting an operation to be executed after said digital computer system is woken up;

determining whether a hibernation mode is set;

if the hibernation mode is set, storing data and an operating system;

executing a warning operation prior to turning off a main power to said digital computer system, wherein executing the warning operation comprises the steps of:

searching for a telephone number corresponding to a wake up request source, and calling through a communication control said telephone number;

transmitting a stored message to said telephone number called prior to tuning off the main power to said digital computer system; and sending a warning sound through a speaker prior to turning off the main power to said digital computer system;

turning off the main power to said digital computer system; and operating in the hibernation mode if the hibernation mode is set.

\* \* \* \* \*